Aug. 19, 1969 E. J. STERNGLASS 3,462,601

GAMMA RAY, X-RAY IMAGE CONVERTER UTILIZING A SCINTILLATION CAMERA SYSTEM

Filed Oct. 14, 1965 3 Sheets-Sheet 1

WITNESSES:

Leon M. Garman

Lewis Gable

INVENTOR

Ernest J. Sternglass

BY

Charles F. Renz

ATTORNEY

United States Patent Office 3,462,601
Patented Aug. 19, 1969

3,462,601

GAMMA RAY, X-RAY IMAGE CONVERTER UTILIZING A SCINTILLATION CAMERA SYSTEM

Ernest J. Sternglass, Pittsburgh, Pa., assignor to Westinghouse Electric Corporation, Pittsburgh, Pa., a corporation of Pennsylvania Filed Oct. 14, 1965, Ser. No. 496,076
Int. Cl. G01t 1/20
U.S. Cl. 250—83.3 20 Claims

ABSTRACT OF THE DISCLOSURE

This invention relates to radiation systems and includes in one illustrative embodiment an element for converting radiation images of such types as gamma rays and X-rays into corresponding electron images, suitable electrodes for accelerating and intensifying the electron image, an element for converting the intensified electron image into a radiation image, a television camera device including a suitable photo-cathode element for converting the radiation image into an electron image which is directed onto a suitable storage electrode having the properties of storing in excess of $10^4$ electrons per element, and a suitable electron gun for scanning the storage electrode to derive an output signal. In one illustrative system, a pulse height discriminator is used to reject that portion of the signal derived from the television camera device corresponding to spurious radiation. In another embodiment, signals at varying potentials may be derived from the target electrode to provide an equidensity representation of the radiation image.

This invention relates to radiation detecting devices and more particularly to electronic imaging systems for producing a graphic presentation of the distribution and concentration of the sources of radiation.

Radiation techniques for diagnosis and therapy are now well established clinical tools, and further advances are being made constantly. In the diagnosis and treatment of diseases, the use of radioisotopes are proving to be cheaper and more convenient than the use of external sources of X-rays and radium. Treatment through the intravenous insertion of radioactive materials can be performed more easily and more accurately than with the use of external sources of radiation.

Until recently, the only practical means of detecting the spatial distribution of radioisotopes in the human body involved the use of mechanically scanned scintillation detectors. In this procedure, a directional gamma ray detector is moved over the subject in a pattern of parallel sweeps and the electrical output of this device is used to reproduce an image of the radioactive distribution upon a recorder. Typically, a mechanical scintillation detector includes a crystal of sodium iodide which is coupled to a multiplying photo tube. The detector is supported on a mechanical means such as a boom which reciprocates along a series of parallel, rectilinear paths to cover a predetermined area. Scintillations in the crystal, which occurs when gamma rays interact with the crystal, are converted to electrical impulses by the phototube, which are in turn used to produce the graphical representation of the distribution of the radioactive materials. Mechanical scintillation detectors require 20 to 60 minutes to produce a graphical representation of the distribution; such extended lengths of time may, of course, prove to be very uncomfortable to the sick patient who is required to remain motionless throughout this process. Further, such detectors often require the use of high intensity doses of radiation which may produce an injurious effect on the patient; thus, this requirement may limit the scope of investigation of such mechanical scintillation detectors to those less sensitive organs.

Within the last years, scintillation camera systems have been developed in which an image of an entire organ may be obtained at one time. In a system recently developed, by H. O. Anger, the gamma rays are directed as by a multiaperture collimator onto a suitable image detector such as a crystal; an array of photomultiplier tubes are disposed behind the crystal detector to view overlapping areas of the crystal detector. When a scintillation occurs, the light derived from the scintillation is divided among the tubes, with the closest tube receiving the most light. Pulses from the phototubes go first to a signal mixing network and then to a position computing circuit which produces an output signal as a function of its position upon the image crystal and of the intensity of the scintillation brightness. In turn, the signals from the computer may then be fed through a pulse height analyzer to a cathode ray tube where they may visually be displayed.

A principal disadvantage of the Anger camera system is that the size of the positioning signals and therefore the location of the visual flash on the display means depends upon the absolute magnitude of the phototube pulse. Therefore, the accuracy of the positioning signal is a direct function of the height and width of the window presented by the pulse height analyzer. It would therefore be desirable to construct a more efficient device in which the positioning signals are not dependent on the magnitude of the pulse height derived from the phototubes.

An improved scintillation camera system has been suggested by M. A. Bender and M. Blau. In this system, the scintillation detector comprises an array of crystals, each of which is optically coupled by two optically transmissive fiber rods with a pair of phototubes. Each phototube has an individual pulse height discriminator, and the output signal of the discriminator is independent of the height of the incoming pulse, if it exceeds the noise level set by the pulse analyzer. One of the two fiber rods is optically connected to a phototube representing the X dimension of the impulse upon the crystal, while the other fiber rod is connected to a phototube representing the Y direction of the recorded impulse. Each of the X and Y amplifiers has a fixed, gated output which is applied directly to a suitable display device such as a cathode ray tube.

The above-mentioned scintillation systems of Anger, and of Bender and Blau have the improved ability of attaining an image with an increased speed by as much as a factor of 10 when compared with ordinary mechanical scanners. Further, the increased speed of obtaining an image does allow for the visual and spatial observation of the dynamic processes within the body and organs of a patient, and also the use of radioisotopes with substantially reduced intensities. However, the spatial resolution obtainable with the above-described systems is only in the order of 10 millimeters.

Although in certain special cases, a higher spatial resolution can be obtained by the injection of radio-opaque material and the use of external X-ray sources, this procedure is substantially limited to the visualization of vasculatures. Thus, it may be well understood that it would be of great value to attain a higher spatial resolution than possible with these radioactive isotope imaging systems and to provide a system which could be employed for all organ systems and compartments of organs. Correspondingly, a further increase in the sensitivity beyond the present scintillation cameras would permit studies of more rapid dynamic and homeostatic processes which are completed in a matter of a few seconds. For example, the detailed nature of the cerebral blood flow could be clarified with time resolutions of the order of 10 seconds and spatial resolutions approaching 1 to 2 millimeters. Functional changes of the cerebral circulation in different areas of the brain, as well as other phases of the circulatory system in the body, could be directly observed. Such a system could be particularly useful in evaluating the interrelation between circulatory changes and functional states in general. Cardiovascular anomalies and abnormalities, pulmonary and hepatic functional and organic disturbances, as well as many other conditions which cause disturbances of the hemostatic dynamic processes would become accessible to direct study.

A possible solution to obtain increased spatial and temporal resolution could be made possible by the use of electron imaging systems whereby an electron image corresponding to the X-ray or gamma scintillations could be greatly multiplied and read-off a target element by conventional television techniques. Such a system would provide for an electronic contrast and control of the recorded image and would also permit the detection and localization of smaller tumors and other space occuping lesions that can be presently observed by virtue of the thinner X-ray phosphor screens employed in such image-intensifiers. A more detailed definition of the size, shape and contour of an organ would be possible with such systems than with conventional mechanical scanners or with scintillation cameras which use a thick crystal detector which inherently limits the resolution of the recorded image. Further, due to the high energy conversion efficiency attainable with such electron imaging systems, high resolution pictures with many distinguishable levels of activity may be attained with the use of low doses of radioisotopes. Since the use of many newly available low-energy emitting radioisotopes would be facilitated with such electron imaging systems, these systems would be valuable for dynamic and homeostatic function studies as well as for morphological studies. Further, the attainment of low radiation doses to the patient is greatly facilitated with a system of rapid time response since it makes possible the use of very short-lived isotopes. Alternatively, with these short-lived isotopes, a greater instantaneous activity can be utilized to obtain the required large numbers of statistically independent photo events for a high resolution picture.

At present, there have been attempts to use an electron imaging device such as an image intensifier to convert an X-ray image into a light image which is multiplied many times. Such systems have been used in conjunction with photographic cameras and also in conjunction with electron imaging camera devices. At present, the systems using an intensifying and a camera device to record X-ray images are limited in their sensitivity and in their dynamic range so that integration and storage of extremely low intensity X-ray images is not practical. Further, as was noted above, pulse-height discriminators have been used with the scintillation detectors of of Blau and Bender, and Anger to reject spurious radiation sources such as background cosmic radiation and scattered radiation as well as noise signals developed within the viewing system. However, the use of pulse height analyzers is not readily adaptable to the known electron imaging camera systems due to their low dynamic range. In particular, the target elements of these camera systems are unable to store a sufficiently large number of electrons before they reach their saturation point. In addition, it is difficult if not impossible to erase the pattern of charges stored upon these target elements within a short enough period to ensure that only one picture element of the scene being viewed is analyzed at one time. Finally, some systems of the prior art have included a storage tube; however, the introduction of such a storage means has introduced an objectionable noise associated with the intermediary amplifying circuits.

Accordingly, it is the general object of this invention to provide a new and improved system for the presentation of a graphical image in response to a source of radiation.

A further object of this invention is to provide a new and improved scintillation camera system capable of substantially higher spatial resolution and contrast discrimination ability.

A still further object of this invention is to provide an improved scintillation camera system whose output signal is capable of utilizing pulse height discrimination to thereby reject background and scattered radiation.

Another object of this invention is to provide a new and improved scintillation camera system having the capability of continuously and simultaneously displaying a visual image at a variety of gain and contrast settings.

A still further object of this invention is to provide an improved scintillation camera system in which the viewed scintillations may be analyzed by pulse counting or scanning a specific portion of the viewed image.

Another object of this invention is to provide a scintillation camera system capable of rapidly reading out an input radiation signal.

A still further object of this invention is to provide a new and improved scintillation camera system capable of recording the radiation emitted by the newly developed low energy emitting, short-lived radioisotopes.

Briefly, the present invention accomplishes the above-cited objects by providing an improved scintillation camera system including an input screen for emitting an electron image in response to an input radiation, and means for intensifying and focusing said electrons onto a target element of great dynamic range. More specifically, the target element has the property and capability of storing a large number of electrons per picture element before its saturation point is reached.

In one particular embodiment of this invention, an image intensifier of the type having an input screen capable of converting an input radiation into an electron image and intensifying the electron image; further, a television camera tube is optically connected to the output screen of the image intensifier to record and to store the image thereon. The television camera tube has a target element therein capable of storing in excess of $10^4$ electrons per picture element before the saturation point of the target element is reached.

A further aspect of this invention involves a second auxiliary means for storing, such as a tape recorder or an electronic storage tube electrically connected to the target element of the scintillation camera system. This serves to provide a means for continuously storing and displaying, as upon a cathode ray tube, a visual image during the period in which the electron image corresponding to the input X-ray and gamma ray radiation is being integrated upon the target element.

A principal aspect of this invention is the incorporation of a pulse height analyzer to be applied to the output signal of the electron camera device to discriminate against system generated noise and spurious radiations seen by the camera device. By reading out the pattern of charges accumulated upon the target element at a rate sufficient to view only one radiation pulse per picture element, the pulse-height analyzer can filter out the spurious signal associated with each picture element of the scene being viewed.

A still further aspect of this invention allows the camera system to provide a visual display of the image wherein the viewed object is shown as a series of traces of equal intensity. Briefly, this may be accomplished by reading out the charge pattern established upon the target in successive steps each of which destructively reads out a portion of the charge pattern at a specified level of radiation intensity. Further, means are provided to record and store the signals derived in the successive steps and to provide a composite picture of these signals.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figures 1, 2:
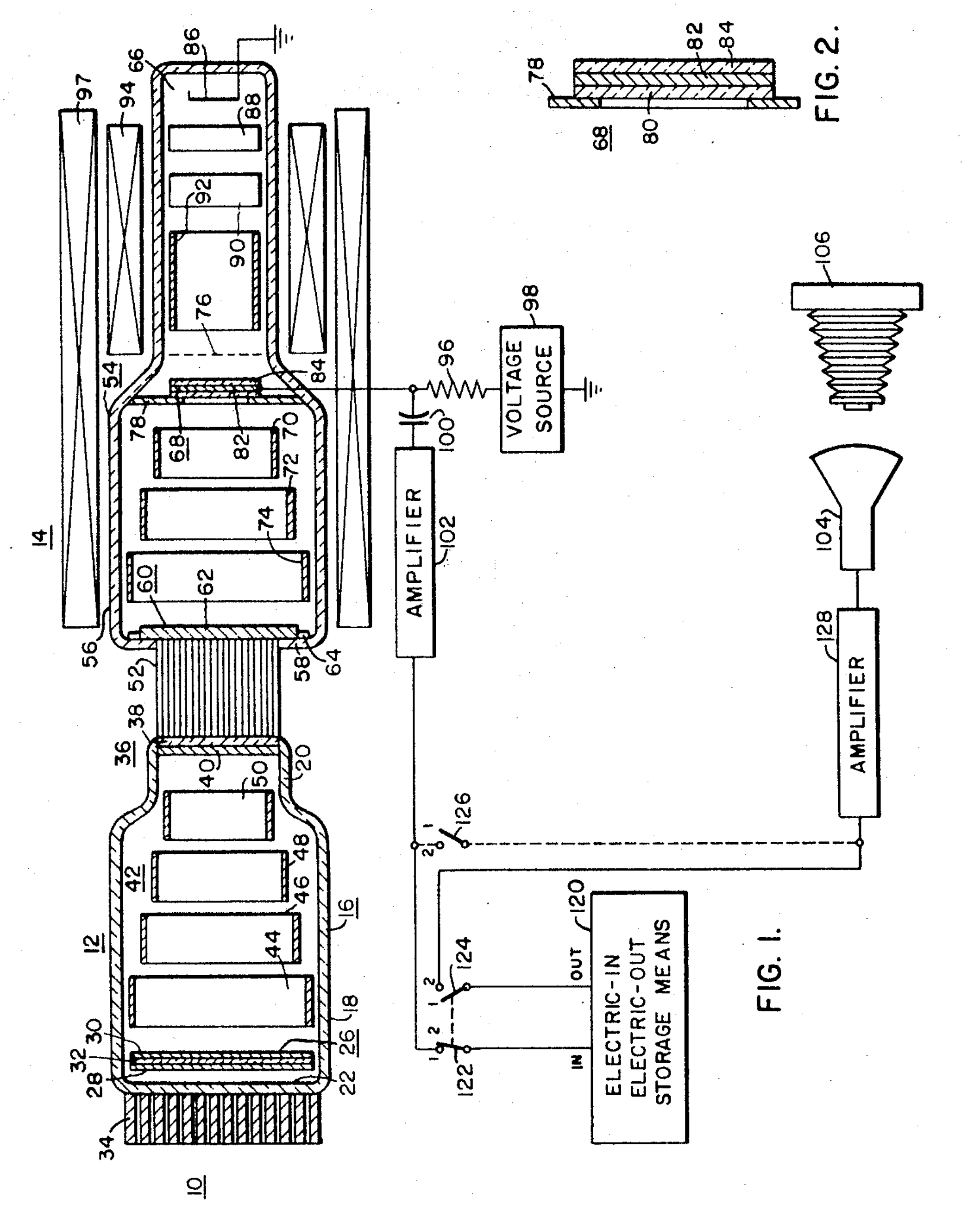
FIGURE 1 is a sectional view of the improved scintillation camera system according to the teachings of this invention.
FIG. 2 is an enlarged view of the target element of the camera device incorporated within the system of FIG. 1.

Referring now to the drawings and in particular to FIG. 1, a scintillation camera system 10 is shown comprising an image intensifier tube 12 and an electron image camera tube 14. The image intensifier tube 12 comprises an envelope 16 having an enlarged cylindrical portion 18 and a restricted cylindrical portion 20. The envelope 12 is made of a suitable insulating material such as glass. The enlarged cylindrical portion 18 is enclosed by an end plate 22 which may be formed as an integral part of the envelope 16, while the restricted portion 20 is enclosed by a fiber optic member 52 which is hermetically sealed to the restricted portion 20.

An input screen 26 is disposed adjacent to and substantially parallel with the end plate 22. An illustrative embodiment of the input screen includes a layer 28 of a suitable X-ray sensitive material such as zinc cadmium sulfide. An X-ray or other radiation image impinging upon one surface of the layer 28 causes the emission of a light image corresponding to the X-ray image from the opposite surface of the layer 28. The input screen 26 also includes a photocathode layer 30 made of a suitable material such as cesium antimony, which is disposed in close optical contact with the X-ray sensitive layer 28. The photocathode layer 30 receives the light image emitted from the layer 28 and in turn generates an electron image which corresponds to the light image impinging thereon. A barrier layer 32, which may be made of glass, is interposed between the layer 28 and the photocathode layer 30 to prevent actual contact of these latter two layers. Further, a suitable collecting or focusing means is disposed adjacent to the end plate 22 of the image intensifier 12 in order that the X-ray and gamma radiations emitted by the object being viewed may be directed onto the input screen 26. A typical focusing means, as shown in FIG. 1, is the multiaperture collimator 34, which is disposed upon the end plate 22. Such collimators are well known in the art and are further described in an article entitled "Multichannel Collimators for Gamma-Ray Scanning With Scintillation Counters," by Newell, Sanders and Miller, and appearing in Nucleonics, July 1952.

In an alternative arrangement of the input screen, a suitable X-ray sensitive layer made of a material such as calcium tungstate, zinc sulfide or sodium iodide could be placed on the exterior surface of the end plate 22 and the photocathode layer could be placed on the interior surface of the end plate, which could be made of a thin layer of approximately 2 mm. of glass. Further, the X-ray sensitive layer could be replaced by a mosaic of scintillation crystals made of material such as sodium iodide or calcium fluoride which could be mounted upon the end plate 22 of the image intensifier tube 12. The principal advantage of this embodiment would lie in the flexibility of allowing a choice of different phosphors for different ranges of X-ray energy emitted by the object being viewed. For example, a mosaic of scintillation crystals having a thickness of from 0.5 to 2 centimeters would have an optimum use for measuring X-rays having an energy in the range of 150 to 500 kilovolts, whereas a mosaic of crystals having a thickness of 2 to 4 centimeters would be more efficiently used with X-rays having an intensity of 500 to 1000 kilovolts. Finally, the end plate 22 could take the form of a bundle of optical fiber made of a fiberglass and bonded together to form a vacuum tight plate. The fiber optics, face plates and members as described are well known in the art and may be commercially obtained from Mosaic Fabrications, Incorporated.

An output target 36 for emitting a light image corresponding to the radiation image directed upon the input screen 26 is disposed within the restricted portion 20 of the envelope 16 upon the fiber optics member 52. The output target 36 may include an electrically conductive, light transmissive layer 38 made of a suitable material such as tin oxide and a light emissive layer 40 made of a suitable fluorescent material such as zinc cadmium sulfide, which has been deposited upon the conductive layer 38. Further, means are provided intermediate the input screen 26 and the output screen 36 for the focusing and acceleration of the electrons emitted from the input screen 26 onto the output target 36. The means for focusing is shown illustratively as an electrostatic lens system 42 which comprises a plurality of cylindrically shaped members 44, 46, 48 and 50 of an electrically conductive material. The conductive members 44 to 50 are each electrically connected to a voltage source (not shown) at the exterior of the envelope 16 so that increasingly positive voltages are applied to the conductive members with the conductive member 50 having the most positive voltage applied thereto.

In the operation of the image intensifier tube 12, X-rays and/or gamma rays are directed upon the multiapertured collimator 34, which confines and directs these radiations onto the input screen 26. Layer 28 in response to the X-ray and gamma ray radiation emits light photons through the barrier layer 32 onto the photocathode layer 30. The photocathode layer 30 emits a flow of electrons forming an electron image corresponding to the radiation image directed upon the input screen 26. In one illustrative embodiment of this intensifier tube 12, a total potential difference of approximately 25 kilovolts was applied between the input screen 26 and the output screen 36. The electron image emitted by the input screen 26 is accelerated and focused under the influence of this potential difference and the progressively more positive voltages applied to the conductive members 44 to 50 onto the output screen 36. The electron image incident upon the light emissive layer 40 of the output screen 36 emits a light image corresponding to the electron image incident thereon. For a further discussion of the structure and operation of the image intensifier tube 12 reference is made to U.S. Patent No. 2,506,299, by J. W. Coltman, entitled, "Image Intensifier Tube" and assigned to the assignee of this invention.

A light conducting means is disposed between the image intensifier tube 12 and the electron image camera tube 14 in order that the intensified image emitted from the output target 36 may be transmitted efficiently to the electron image camera tube 14. In one illustrative example of this invention, the fiber optics member 52 made of a bundle of optically transmissive fibers forms a part of the envelope of the image intensifier tube 12 so that the light image generated therefrom may be efficiently transferred to the electron image camera tube 14. In an alternative arrangement, a fast optical lens could be inserted between these two devices; however, the best conventional optical systems have an efficiency limited to about 5 to 10% of the light collected whereas a fiber optics member may have a light collection efficiency close to 50% of the light collected.

An illustrative embodiment of the electron image camera tube 14 is shown in FIG. 1 as comprising an envelope 54 including a cylindrical wall portion 56 enclosed at one end by a face plate 58. The face plate 58 is hermetically sealed to the fiber optic member 52. This arrangement insures that light image is most efficiently transferred to the electron image camera tube 14. A photocathode element 60 comprises a suitable photoemissive coating 62 made of a suitable light sensitive material such as cesium antimony, which may be easily evaporated onto the surface of the member 52 by well known techniques. A suitable electrically conductive contact to the photoemissive coating 62 may be provided in the form of a conductive ring 64. An electrical lead-in (not shown) may be supplied through the envelope 54 in order that a suitable potential may be applied to the photocathode element 60.

An electron gun 66 is provided at the opposite end of the envelope 54 for generating and forming a pencil type electron beam which is directed onto a target element 68. The target element 68 is positioned between the electron gun 66 and the photocathode element 60 within the wall portion 56 of the envelope 54. Between the target element 68 and the photocathode element 60, there are provided a plurality of electrodes illustrated as 70, 72 and 74 with suitable potentials provided thereon for accelerating and focusing of the photoelectrons emitted from the photocathode element 60 onto the target element 68. Positioned between the target element 68 and the electron gun 66 there is provided a grid member 76 made of a suitable electrically conductive material such as nickel which is disposed at a distance of about .125 inch from a surface of the target element 68.

The target element 68 (see FIG. 2) is comprised of a support ring 78 made of a suitable material such as Kovar alloy (Westinghouse Electric Corporation trademark for an alloy of nickel, iron and cobalt) and a support film 80, which is made of a suitable insulating material such as aluminum oxide to a thickness of about 500 angstroms and supported upon the ring 78. A layer 82 made of a suitably electrically conductive material such as aluminum is deposited upon the support film 80. The thickness of the conductive layer 82 is about 500 angstroms and may be deposited by well known vacuum evaporation techniques. A porous coating or film 84 is disposed upon the layer 82 and is made of a suitable insulating or semiconducting material which exhibits the property of generation of electrons within said coating in response to electron bombardment upon one surface. The secondary electrons are conducted through the voids of the porous film 84 and are emitted from the opposite surface of the film 84. The conduction of the electrons takes place through the voids of the coatings under the influence of a high electrical field $10^4$ volt-centimeter, which is provided by a potential difference between the surface of the layer 84 and the conductive layer 82. The porous coating 84 may be of any suitable material such as an alkali or alkali earth metal compound such as potassium chloride, magnesium chloride or magnesium oxide. The porous coating or film 84 of the target element 68 is characterized by the porous nature of its structure which has a density of less than 10% of its bulk density in order that electron conduction should be carried on through the voids of this material. Further, the porous coating should have a high resistivity in excess of about $10^{15}$ to $10^{17}$ ohms-centimeter. Finally, a principal characteristic of the porous coating 84 is that it should be able to store at least $10^4$ electrons per picture element before the coating will reach its saturation point.

In order to provide a specific illustrative example of this target element, the porous coating 84 may be formed by evaporating potassium chloride in an inert gas such as helium or argon at a pressure of 1 or 2 millimeters of mercury. The density of the porous coating 84 of this particular example is only about 2% of the bulk density of potassium chloride. A typical thickness of this coating is 25 microns which corresponds to a mass per unit area of100 micrograms per square centimeter. The bulk potassium chloride density is 1.984 grams per cubic centimeter.

The electron gun 66 is of any suitable type for producing a low velocity pencil-like electron beam to be scanned over the surface of the target element 68. The electron gun 66 may include a cathode element 86, a control grid 88 and an accelerating grid 90. Further, a conductive coating such as illustrated at 92 is provided on the inner wall of the envelope 54 in the space between the electron gun 66 and the target element 68 for providing a suitable electrostatic field. The electrodes 88 and 90 of the electron gun 66 along with the coating 92 provide the means for focusing the electron beam onto the target element 68. Deflection means 94 illustrated as a coil is provided about the envelope 54 for deflection of electron beams emitted by the electron gun 66 and by application of suitable current scans the electron beam over the surface of the target element 68 in a conventional manner. A magetic coil 97 is also disposed about the envelope 54 to focus the electron beam onto the target element 68 as well as to focus the electrons emitted by the photocathode element 60 onto the target element 68.

In the operation of the electron image camera tube 14, radiations in the form of a light image transmitted through the fiber optics member 52 are focused onto the photocathode element 60 and photoelectrons are emitted from each portion of the photocathode element 60 corresponding to the amount of light directed thereon. The photoelectrons are focused as by the electrodes 70, 72 and 74 onto the target element 68. The photoelectrons are accelerated to a sufficient energy of approximately 8000 electron volts so that they penetrate through the conductive layer 82, the support film 80 and enter into the porous coating 84. The acceleration voltage should be adjusted so that substantially all of the primary electrons emitted by the photocathode element 60 almost penetrate the entire target element 68 but do not pass through the structure. The primary electrons emitted by the photocathode element 60 create a number of low energy electrons within the porous coating 84, orders of magnitude higher than the incident or primary electrons. Due to the porous nature and to the high gain of the coating 84, the number of secondary electrons generated may be approximately 100 to 200 for each incident primary electron.

A voltage source 98 is interconnected between ground and the conductive layer 82 of the target element 68 through a load impedance 96. The target element 68 may be polarized prior to the impact of the photoelectrons by applying a positive voltage of about 5 volts from the potential source 98 onto the conductive layer 82 and by stabilizing the exposed or exit surface of the porous coating 84 at ground potential. Typically, this may be accomplished by scanning the electron beam generated by the electron gun 66 onto the porous coating 84 of the target element 68. The low energy secondary electrons generated within the porous coating 84 under impact of the photo-electrons from the photocathode 60 cause the exit surface to change its potential locally due to the conduction of electrons through the vacuum spaces or voids of the porous coating 84. The field created between the positive conductive layer 82 and the exposed surface of the porous coating 84 attracts most of the secondary electrons generated in the layer towards the positive conductive layer 82. Thus, due to the loss of electrons, a more positive charge is established on the exposed surface of the porous coating 84. As a result, a pattern of charges is disposed upon the surface of the porous coating 84 corresponding to the pattern of light directed through the fiber optics member or face-plate 52 and of the radiation incident upon the image intensifier tube 12.

A signal representative of the pattern of charges established upon the target element 68 may be derived by continuing to scan the electron beam emitted by the electron gun 66 onto the exposed surface of the porous layer 84. The scanning electron beam causes the surface of the porous layer 84 to return to substantially ground potential (i.e., the potential of the cathode element 86) thereby causing a capacitive discharge across the porous layer 84 and a current pulse representing the elemental charge through the conductive layer 82. Thus, due to the continuing scanning of the electron beam, a series of voltage pulses representing the radiation image is established across the load impedance 96.

As an alternative embodiment of the scintillation camera system 10 shown in FIG. 1, the electron image camera tube could be so modified to provide pre-storage intensification of the electron image emitted by the photocathode element 60. This could for instance be accomplished by inserting one or more dynodes (depending on the intensification or multiplication desired) between the photocathode element 60 and the target element 68. Alternatively, a separate image-intensifier will be inserted, or an extra stage of intensification could be added to the image intensifier. In one specific embodiment of this alternative camera tube, the dynode might include a layer of conductive material such as aluminum with a layer of potassium chloride having a density of 100% of its bulk density deposited thereon. By applying successively more positive voltages to each of the dynodes, the electron image emitted by the photocathode element 60 would be successively directed upon the series of dynodes thus producing a corresponding image of secondary electrons which would be multiplied by each dynode to provide a higher degree of multiplication. The intensified or multiplied electron image is then focused upon the target element 68 and a signal derived therefrom as described above.

Prestorage intensification of the electron image representing the radiation pattern could be achieved in the alternative manner by inserting a transmissive dynode between the photocathode layer 30 of the image intensifier tube 12 and the output target 36 thereof. Such an intensifier tube 12 has been described in detail in a copending application, Ser. No. 158,416 by Anderson and Goetz, entitled "Image Device" and assigned to the assignee of this invention.

Thus, there is shown a scintillation camera system capable of producing a video output signal across the load impedance 96 corresponding to the radiation image derived from the object being viewed. In addition, a coupling means such as a capacitor 100 is electrically connected across the load impedance 96 to direct the video output signal to an amplifier 102. The amplifier 102 may be of any of the well known designs in the art and is incorporated in this system to adapt and apply the output signal to an electrical in, electrical out storage means 120.

Briefly, in the operation of the scintillation camera system 10, the radiation is collected by the collimator 34 and is intensified and multiplied by the image intensifier tube 12. The intensified, visual mage is then transmitted as by the fiber optics face-plate 52 onto the photo-emissive coating 62 of the electron image camera tube 14'. The electron image emitted by the photoemissive coating 62 may then be integrated upon the target element 68 for a period ranging from a fraction of a second to several minutes in order that a charge pattern may accumulate on the porous coating 84 of the target element 68. It is noted that during the integration of the electron image upon the target element 68, that the electron beam emitted by the electron gun 66 is turned off so as to allow the continued integration and storage of the pattern of charges upon the target element 68. In order to read out the information stored on the target element 68, the electron gun 66 is energized to produce an output video signal across the load impedance 96 as explained above. The output signal is then applied to the image storage means 120.

It is noted that in an alternative embodiment that the output signal derived from the image camera tube 14 could be applied directly (see dotted line) through a switching means 126 and an amplifier 128 to a display means such as a cathode ray tube 104. In this embodiment, the visual image displayed upon the cathode ray tube 104 may be photographed and permanently recorded by a photographic camera 106. The photographic camera 106 has been synchronized with the energization of the electron gun 66 and the closing of switching means 126 so as to photograph the optical image displayed upon the cathode ray tube 104 as it is being read off of the target element 68. Since the process of reading out the stored pattern of charges upon the target element 68 is destructive of the pattern, it would be necessary to synchronize the reading out of this pattern of information with the exposure of the film within the camera 106. Finally, in order to accomplish the integration and storage of the electron image representing many quanta per picture element of the radiation image, the electron image camera tube and in particular the target element 68 has to have the property of a large dynamic range corresponding to a great storage capacity across the porous coating or layer of the target element 68. In the illustrative embodiment of the radiation camera system as shown in FIG. 1, the output signal derived from the target element 68 from the image camera tube 14 is applied through the amplifier 102 to the electrical in, electrical out storage means 120. Illustratively, the storage means may be an electron image storage tube including a target element upon which may be stored a pattern of charges, and an output signal derived therefrom representative of the pattern of charges. More specifically, the target element may be scanned with a pencil beam of electrons to obtain the output signal without erasing the pattern of charges established upon the target element. The specific structure and operation of such a storage image tube is described in U.S. Patent No. 2,859,376 to Kirkpatrick.

Referring now to FIG. 1, the output of the preamplifier is directed through a switching means 122 to the input of the storage means 120. The output of the storage means 120 is connected through a switching means 124 to the amplifier 128 which applies the output signal to a suitable display means such as the cathode ray tube 104. As explained above, the visual image may be permanently recorded by the photographic camera 106. Further, the switch means 122 and 124 may be connected with each other so that one of the switching means is in a closed position while the other means is open.

In the operation of the television camera system shown in FIG. 1, the radiations such as X-ray and gamma rays are collected by the collimator 34 and are intensified or multiplied by the image intensifier tube 12. The intensified image of the tube 12 is coupled as by the fiber optics member 52 to the image camera tube 14. The optical image is converted by the photoemissive coating 62 to an electron image which is directed upon the target element 68. An output signal is derived from the target element 68 and is preamplified and directed through switching means 122 to be stored by the means 120. The purpose of incorporating the storage means 120 in the system shown in FIG. 1 is to provide a continuous display of the image being viewed while the image camera tube 14 integrates the next image received from the intensifier tube 12. Thus, where it is desired to view images of low level images or images of low contrast, the electron image emitted by the coating 62 may be integrated for a period of time ranging from a fraction of a second to minutes upon the target element 68 to thereby increase the strength of the image being sensed. At the end of each integration, the switching means 122 is disposed in the first position to allow the camera tube 14 to transmit the video signal to the storage means 120. Since the storage means 120 is capable of repeated, non-destructive readout over a period of many minutes, it is possible to continuously view the recorded image upon the display means 104 while the next image is being integrated upon the target element 68. More specifically, during the integration period, the switching means 122 and 124 are disposed in their second position thereby allowing the image stored upon the target member 146 to be repeatedly read out and displayed upon means 104. A further advantage of the intermediate storage means 120 is that it provides an alternative mode of operation in those cases where the memory storage capacity of the camera tube 14 may otherwise be overloaded. This could happen when very low contrast images are being viewed or when longer periods of integration are desired where the thermal background emission of the X-ray image intensifier might tend to fill up the camera tubes memory. In addition, this system would permit one to record various features of the organ under examination without loss of any information or extra dose to the patient and also to view and to examine as by the photographic camera 106 the stored image at a variety of contrast and gain settings.

With regard to the camera system shown in FIG. 1, it is noted that the image storage tube 120 could be replaced with either a magnetic recording disc memory or with a tape recorder which could be used to record the signal read out from the target element 68 and to repeatedly, non-destructively provide an output signal to be displayed upon means 104.

Figure 3:
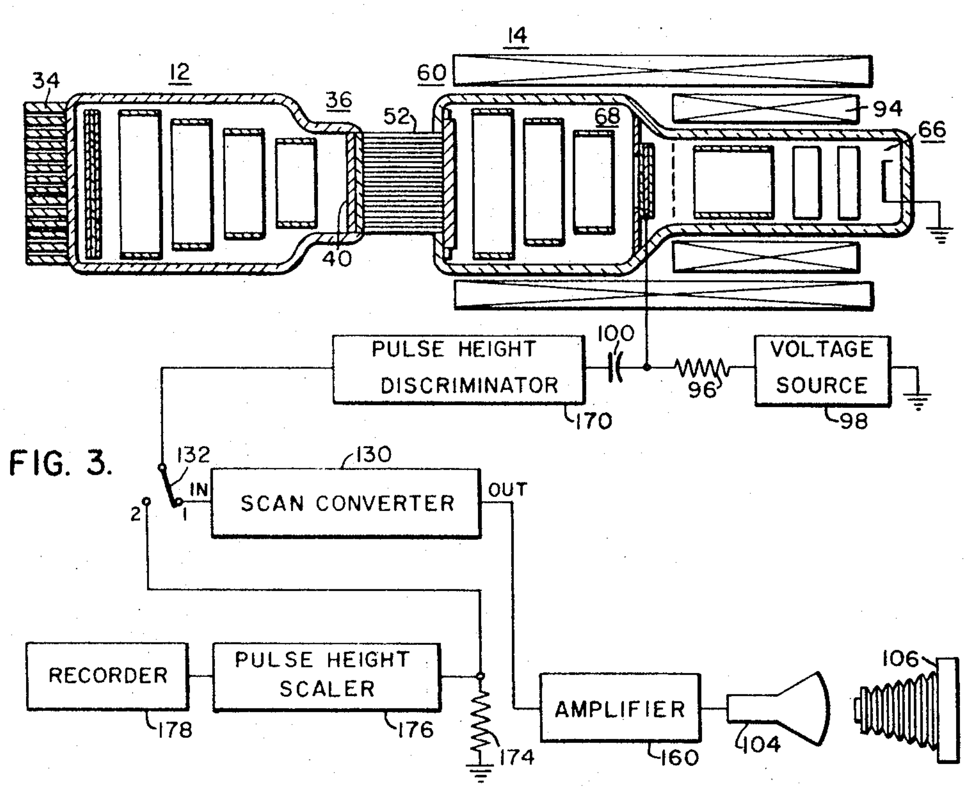
FIGS. 3 and 4 are schematic views of further embodiments of the scintillation camera system of this invention.

Referring now to FIG. 3, one of the most important embodiments of the camera system of this invention is shown. More specifically, the camera system of FIG. 3 comprises an image intensifier tube 12 optically connected as by a fiber optics member 52 to an electron image camera tube 14. Further, the output signal is derived as explained above from a target element 68 which is directed through a pulse-height discriminator 170 to a switching means 132. The switching means 132 in its first position connects the pulse height discriminator 170 to a storage tube 130 of the scan converter variety. Typically, the storage tube 130 includes a writing electron gun for establishing a pattern of charges upon a target element. A separate reading electron gun may continuously scan the target element to derive an output signal which is directed through an amplifier 160 to be displayed upon a cathode ray tube 104. An illustrative example of a suitable storage tube to be incorporated in the system of FIG. 3 is described in U.S. Patent No. 3,124,715 to G. L. Cox and assigned to the assignee of this invention.

Alternatively, the switching means 132 may be disposed in a second position thereby connecting the discriminator 170 to a pulse-height scaler 176 whose output signal is connected to a voltage indicating means such as a moving pen recorder 178. Further, the output signal of the discriminator 170 develops a potential across an impedance 174 which is applied to the pulse height scaler 176.

In the viewing of isotopes injected within the human body, there are many other extraneous sources of radiation. For instance, the cosmic and gamma rays which are inherently found in the environment will be detected as a low level noise; further, gamma rays and X-rays which may be scattered by other portions of the body may be sensed as random signals which of course do not give an accurate image of the organs being viewed. In the mechanical scintillation scanners of the prior art, it was known to use means for discriminating these random emissions in order to only reflect the higher intensity scintillations from the organ or organs desired to be viewed. However, when the technique of pulse height discrimination was attempted by television camera systems of the prior art, it was found that the dynamic range of these devices was so small as to probihit the accurate and effective discrimination against unwanted signals. Thus, it is an important aspect of this invention to provide an image camera tube 14 having the characteristic of a wide dynamic range. In the typical camera tubes of the prior art, the saturation of the target element would occur at a low level of just a few volts. Thus, it was found very difficult if not impossible to discriminate against those signals having only a few tenths of a volt magnitude and to obtain those signals desired to be detected. One of the significant advantages of the target element 68 described above is that the level of saturation is significantly higher, often in the range of 15 to 25 volts; with a target element of this dynamic range, pulse discrimination may be easily performed thus allowing the rejection of extraneous signals which was impractical with the camera tube systems of the prior art. Further, in order to perform pulse height discrimination, it is necessary to discharge the charge pattern rapidly so that the output signal obtained during a single scan of the target element represents only one quantum of radiation per picture element. The target element 68, due to its porous nature, has the capability of being rapidly discharged. It is noted that the target elements of prior art camera devices require significantly longer times to erase the target elements. A further advantage of being able to erase within a single scan of the target element 68 is the increased signal amplitude obtainable from this system. It is understood that the output signal is a function of the charge stored on the target element and that by collecting substantially the entire charge upon the backplate of the target element an increase in the amplitude of the output signal is realized.

In the television camera system as shown in FIG. 3, the output signal is derived from the target element 68 and is fed through the capacitive coupling means 100 to the pulse height discriminator 170. Pulse-height or amplitude discriminators are well known in the art and an exemplary circuit which could be incorporated into the system of FIG. 3 is disclosed in Millimicrosecond Pulse Techniques, by Lewis and Wells, 1954, at pages 232 to 239. In the operation of the television camera system as shown in FIG. 3 to perform pulse-height discrimination, the time in which the image camera tube 14 views the intensified optical image is set so that only one quantum of radiation per picture element is detected and stored between reading scans of the image tube. Thus, in order to conduct a pulse height discrimination, it is necessary to view only one scintillation or pulse from each picture element of the image being viewed. It is noted that if a plurality of pulses were allowed to be stored or integrated upon the target element 86 of the image tube 14, that the individual intensity of the radiation could not be sensed but rather a statistical summing of the radiation scintillations would be recorded. Thus, in the operation of the image tube 14, the reading beam scans the surface of the target element 68 at a sufficiently high rate to insure that the period between scans is short enough to insure that only one photon or only one scintillation is observed from each picture element. In an exemplary method of conducting pulse height discrimination, the rate of scanning the image tube 14 was set at $\frac{1}{30}$ or $\frac{1}{60}$ of a second for the case of low gamma fluxes as encountered in medical applications. However, for higher fluxes, more rapid scan rates may be used. The pulse height discriminator 170 can be adjusted to accept only pulses above a certain amplitude, or if desired, within a certain range of amplitudes. Thus, the discriminator 170 can be set to reject not only system-generated noise, but also against noise from scattered radiation of cosmic rays.

The properly selected pulses can now be used to generate a picture via the scan converter tube 130 and the cathode ray tube 104 or to register directly upon the pulse-heights scaler 176. Scaling circuits are well known in the art and a typical circuit such as described in Millimicrosecond Pulse Techniques, by Lewis and Wells, 1954, pages 239 to 244 could be incorporated into the television camera system shown in FIG. 3.

In a first mode of operation; the pulse height scaler 176 may be inserted into the output circuit of the pulse height discriminator 170 in order to record a quantitative count of the activity of selected areas of the image as a function of time. The output of the pulse heights discriminator 170 is applied through the switching means 132 and across the matching impedance 174 to the scaler 176. It is necessary to set the value of the impedance 174 so as to match the rate of decay of the phosphorous light emissive layer 40 of the image intensifier tube 12. The pulses developed across the impedance 174 are applied to the pulse heights scaler 176 which in turn provides a potential dependent upon the number of pulses directed upon the recorder 178. Typically, the recorder 178 is of the moving pen variety and will produce a graphic record showing the number of pulses received by this system as a function of time.

In the alternative method of operation, the pulse height discriminator 170 could be applied to the scan converter tube 130 as described above and a visual image could be obtained upon the cathode ray tube 104. The scan converter tube 130 writes the signal obtained from the camera tube 14 at a scan rate determined by that of the electron gun 66, onto the target element of the tube 130. A reading gun is used to continuously derive a signal from this target element at a suitable rate to be displayed upon the cathode ray tube 104. It is noted that by the substitution of a suitable switching means that a continuous visual display could be established on the cathode ray tube while a quantitative measure could be provided on the recorder 178.

As a further modification of the method of pulse-height discrimination, the scanning of the target element 68 of the image camera tube 14 could be conducted only over a small portion of the target element 68 to thereby closely examine a small area of the scene being viewed by the image intensifier tube 12. The breadth of the scanning may be controlled by the current signal applied to the deflector means 94. Alternatively, the reading beam emitted from the electron gun 66 could be simply pulsed upon a particular element or portion of the target element 68, as opposed to being scanned across the surface of the target element 68. In this manner, the number of pulses or scintillations emitted from a single element of the scene being viewed could be counted. Thus, there has been shown a method and a means of obtaining a quantitative measure of the radiation photon flux in any selected portion or element of the image, which can be chosen by adjustment of the scanning circuits of the image camera tube 14 or by masking out all the desired area in this scene being imaged. In effect, the television camera system is now a scintillation counter, giving quantitative information of isotope uptake rates or resident time of a vital nature for medical diagnosis.

As mentioned, additional intensification may be obtained by inserting secondary emissive dynodes into either the image intensifier tube 12 or the camera tube 14. This additional intensification finds a particular use in the pulse-height discrimination techniques of this invention, where it is desired to build up the amplitude of each individual pulse to a height well above the noise of associated amplifier circuits. In this manner, the limits of the pulse-height discriminator 170 may set without regard to the noise introduced by the camera system 10 and its associated circuits.

Figure 4:
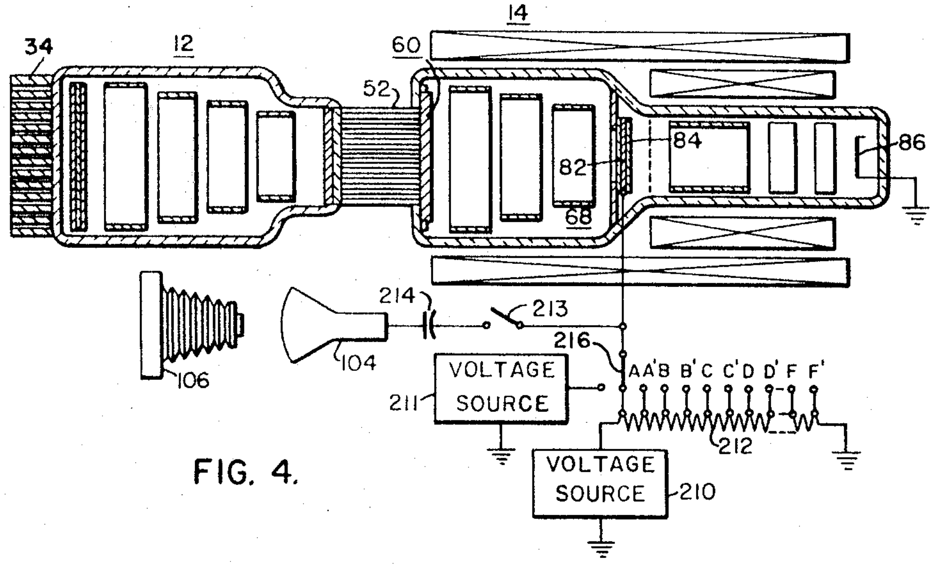

Referring now to FIG. 4, there is shown a television camera system capable of producing an equidensity plot of radiation such as X-ray or gamma rays received from the image being viewed. Briefly, the radiation image is focused as by the collimator 34 upon the image intensifier tube 12. The light output of the tube 12 is optically connected as by the fiber optic face plate 52 to the electron image camera tube 14. As described above, the light image is converted into an electron image by the photocathode element 60 and a resulting charge distribution is disposed upon the target element 68. Further, a beam of electrons is emitted by the cathode element 86 and is scanned in a raster across the surface of the porous coating 84 of the target element 68; due to the capacitive coupling across the porous coating 84, an output signal is derived from the conductive layer 82. The conductive layer 82 is shown in FIG. 4 as being connected by a switching means 216 to either an impedance 212 having a plurality of spaced taps A, A', B, B', C, C', D, D', E, E', F, F', or through a potential source 211 to ground. A potential source 210 is connected across the impedance 212 to provide the desired voltages to the target element 68. The output signal as developed across the impedance 212 is connected through a switching means 213 and a capacitance 214 to the display means 104. The video output signal of the camera tube 14 as visually displayed upon the cathode ray tube 104 may be photographed as will be explained later by the photographic camera 106.

Figure 5:
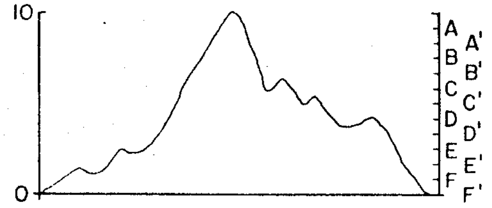
FIG. 5 is a graphical representation of the charge stored upon a line of the target element of the camera device shown in FIG. 4.

In preparation for writing a pattern of charges upon the target element 68, it is desirable to prime the target element 68. To accomplish this first step, the switching means 216 is connected to the potential source 211 to thereby apply a potential of approximately 10 volts positive with respect to ground upon the backplate 82. Due to the capacitive action across the insulating layer 84, the surface of the layer 84 is likewise drawn positively. The electron beam as emitted from the cathode element 86 is attracted to and is scanned across the surface of the layer 84 thereby driving the surface negatively to ground potential. It is noted that due to the potential drop between the exit surface of the layer 84 and the backplate 82 that an electric field has been established across the layer 84. With the switching means 216 still connected to the potential source 211, the photoelectrons as generated by the photocathode element 60 are accelerated with sufficient energy to penetrate the support film and the conductive layer 82 and thereby to be substantially absorbed within the porous coating 84. Under the influence of the electric field established across the layer 84 the secondary electrons are directed toward and are collected by the back plate 82. Due to a net loss of electrons, a positive charge distribution is disposed upon the exposed surface of the coating 84 which reduces the initial uniform negative charge deposited during the priming operation. A representation of a portion of the charge distribution upon the surface of the porous coating 84 is shown in FIG. 5. More specifically, there is indicated that portions of the surface of the porous coating 84 are established at zero potential whereas other portions are established at intermediate values with a maximum charge to approximately 10 volts.

A principal aspect of the system shown in FIG. 4, lies in the specific method of reading out the signal stored upon the target element 68 and recording this signal to provide the desired equidensity trace of the radiation emitted from the scene being viewed. Generally, the method of reading out involves a plurality of readout operations in which each operation records the configuration of the charge distribution upon the target element 68 above a particular charge level. More specifically, the first readout step would be conducted with the switching means 216 connected to the A tap of the impedance 212 and the potential source 210 applying a negative potential of approximately 9.5 volts to the conductive layer 82 of the target element 68. Due to the capacitive action across the porous coating 84, the levels of the charge pattern are reduced by a corresponding amount, i.e., 9.5 volts; therefore, referring to FIG. 5, there is a portion of the charged distribution above the line designated A that will be positive whereas those portions below line A will be negative with respect to ground. When the readout beam of electrons emitted by the grounded cathode element 68 scans the surface of the porous coating 84, the electron beam is only attracted to those portions of the surface of the porous coating 84 which are positive with respect to ground. In other words, the electron beam will land on that portion of the target element which is charged positively (i.e., that portion of the charge distribution above line A) and the deposition of charge from the reading beam of electrons onto the surface of the coating 84 causes a capacitively coupled signal to flow through the conductive layer 82 to the impedance 212. A video signal corresponding to the current passing through the impedance 212 is passed through the capacitance 214 and an image will be displayed upon the cathode ray tube 104. It is specifically noted that the readout beam during the first readout step returns the exposed surface of the porous layer 84 to the potential of the cathode element 86 which is at ground, in a single frame scan. Thus, that portion, as shown in FIG. 5, of the potential distribution which was disposed at a positive potential (i.e., that portion above line A) during the first readout operation has been erased. Only the portion of the potential distribution that was disposed at a negative potential (i.e., below line A) will remain after the first readout operation.

Figure 6:
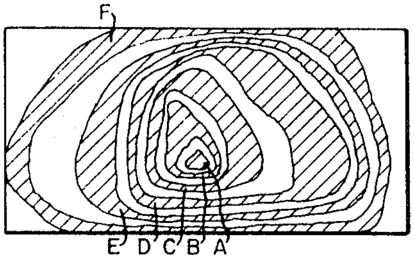
FIG. 6 is a representation of an equal radiation density plot of the radiation image as photographed upon the display device of FIG. 4.

Referring to FIG. 6, a photographic or other reproduction is shown representing the equidensity traces of the radiation irradiated upon the camera system of FIG. 4. In the first read out operation, the video signal corresponding to that portion of the charged distribution above line A (see FIG. 5) will be directed through a switching means 213 to the cathode ray tube 104 and be displayed thereon as an outline of the radiation at and above this level and may be photographed by the photographic camera 106 to be reproduced as the trace A upon the reproduction shown in FIG. 6.

In order to distinguish clearly between the successive traces that are to be derived, it is necessary to perform a second erasing step before the next trace may be recorded. In this step, the switching means 213 is disposed in an open condition so to disconnect the display means 104 from the target element 68 and the switching means 213 is connected to the A′ tap of the impedance 216 thereby placing a voltage of approximately 9.0 volts upon the target element. Next, the electron beam is scanned across the surface of the layer 84 thereby erasing that portion of the charge pattern between the lines A and A′. Since the switching means 213 is open during the second erasing step, no image is displayed upon means 104 and, as a result, a blank ring will appear between the first and second traces. The blank space is provided to distinguish clearly between the successive traces.

In the next operation, the switching means 216 is connected to the B tap and a less negative potential is applied to the conductive layer 82 of the target element 68. During the second readout operation, the positive potential distribution upon the surface of the porous coating 84 is capacitively coupled to the conductive layer 82 and is reduced by the negative voltage developed across the impedance 212 or approximately 8.5 volts.

The scanning electron beam as emitted by the cathode element 86 will be only attracted to that portion of the potential distribution which is established at a positive potential (i.e., that portion above line B); therefore, the electron beam bombarding this portion of the surface of the porous layer 84 will cause a capacitively coupled signal to flow through the impedance 212 and a corresponding signal to be displayed upon the cathode ray tube 104. As mentioned above with regard to the first readout step, the readout electron beam will also return that portion of the charge distribution to the ground potential of the cathode element 86. Next, a second exposure will be made by the photographic camera 106 and a second trace will be recorded upon the photographic film corresponding to the configuration of the potential distribution upon the target element 68 as sectioned by trace B. Then the switching means 213 is again opened and a second erasing step is performed to discharge that portion of the charge distribution between lines B′ and B. In this manner, a blank area is provided around the B trace to distinguish it from the A trace and the other traces to be made.

In a like manner, the switching means 216 is successively connected to each of the C to F positions upon the impedance 212, and a capacitively coupled signal is derived from the conductive layer 82 corresponding to the potential distribution read out at the varying levels determined by the potential applied to the conductive layer 82. It is noted that incrementally less negative voltages are applied to the target element 68 to provide traces upon the cathode ray tube 104 representing charge distributions and thus radiation intensities of successively lower levels. Correspondingly as the trace appears upon the cathode ray tube 104, an exposure is taken by the photographic camera 106 to thereby record upon a photographic film each of the traces as displayed upon the cathode ray tube 104. As shown in FIG. 6, the developed photographic film will have an equidensity trace corresponding to the charge distribution upon the target element 68 and to the varying levels of radiation focused upon the camera system from the X-ray source.

It is noted that the intermediate erase step may be omitted from the steps outlined above. In some cases it may be acceptable to provide a series of photographs showing each stage of equal intensity. In this instance, a separate photograph may be taken as the trace is read out from the target element 68 and displayed upon means 104.

Thus, there has been shown a novel appartus and method of obtaining an equidensity plot or traces of radiation from a source such as a human organ into which there has been injected radioactive isotopes. From such a photographic reproduction, the doctor is able to more clearly distinguish between areas of differing isotope concentration within the organ being examined. In the past, such equidensity plots of X-ray radiation could only be obtained through complex computers or very expensive mechanical isodensity tracers. By the television camera system as shown in FIG. 4, and the method described herein, a substantially faster and less expensive apparatus has been shown of obtaining these valuable graphs.

One feature of this invention is to provide an image camera system which is capable of intensifying the radiation such as X-rays or gamma rays to a degree sufficient to sense each radiation quantum and with a sufficient dynamic range to record each photoelectron incident upon the storage target member. As a direct result of such a combination, one is able to detect small contrast differences in X-ray images which camera systems of the prior art were unable to do with a resolution that the mechanical scanners of the prior art cannot approach. Further, due to the wide dynamic range of this camera system, the camera system is able to perform pulse-height discrimination and also to provide equidensity traces of the X-ray image being viewed. In the storage target element as described with regard to FIG. 2, each photoelectron emitted by the photocathode element 60 results in the deposition of about 100 to 200 charge units on a highly insulating, low density storage layer which can accumulate and store these charges without any significant loss of resolution over a period of many hours. The gain of the target element 68 is essentially noiseless thereby combining both the characteristics of high sensitivity with a low noise readout.

In order to understand how the camera system of this invention can approach the ideal limit of recording every quantum of radiation absorbed in the input screen 26 of the image intensifier tube 12, the following figures may be considered. First, it is noted that isotopes emitting gamma rays in the range of 40 to 150 kev. have been found to offer many advantages over higher energy isotopes; for example, such isotopes as Tc–99M or Hg–197 may provide a greater activity to thereby obtain the required large number of independent photo events for a high resolution picture while insuring greater safety to the patient in that lower total doses of the isotopes are required. For the purposes of these exemplary calculations, it will be assumed that radiation emitted by an isotope having an energy of 100 kev. is absorbed by the screen 26 of the image intensifier tube 12. Further, it may be conservatively estimated that the screen 26 has a conversion efficiency of approximately 10%; as a result, $10^4$ ev. (electron volts) are available to form photons, each of which typically carries 3 ev. giving a total of 3300 visible light photons for each gamma ray absorbed. At a typical quantum efficiency of 10% for the photocathode layer 30 of the input screen 26, 330 photoelectrons will be released from the input screen 26. These photoelectrons are accelerated to approximately 25 kev. and strike the output target 36, which in turn has a typical conversion efficiency of 8%. Thus, a total energy equal to $330\times25\times10^3\times0.08$ ev.—$6.5\times10^5$ ev. is available to form photons at the output target 36, thus resulting in a light output of $2.2\times10^5$ photons per gamma ray absorbed. These photons are now collected and optically focused on the camera tube 14 by the fiber optics member 52. With such fiber optics coupling means, a transmission efficiency of close to 50% may be realized, and approximately $1.1\times10^5$ photons would strike the photocathode element 60 of the camera tube 14 for each gamma ray absorbed. Typically, the photocathode element 60 may realize a quantum efficiency of 10%, and as a result $1.1\times10^4$ photoelectrons are released per gamma ray absorbed. Since the porous, storage target element 68 has the property of a high gain in the order of 100 or more, approximately $1.1\times10^6$ electronic charges can be registered on the porous coating 84 of the target element 68 for each X-ray absorbed. Thus, it has been found that the degree intensification and the gain provided by the target element of this camera system is more than sufficient to override the inherent noise of the associated systems and also to be capable of reaching the theoretical limit of performance of detecting every gamma ray absorbed while allowing pulse height discrimination against the background noise. Further, it is noted that if a conventional lens system is substituted for the fiber optics coupling means 52 or if low energy quanta are to be imaged, additional intensification may be necessary to amplify each pulse above the inherent noise levels of associated circuits for pulse-height discrimination purposes.

Basically, a gamma ray camera system must operate at the lowest possible radiation levels because of patient dose considerations, which corresponds to the condition where contrasts and resolution are limited by the quantum nature of the radiation viewed. The fundamental relationship involved is a statistical one between the number of recorded individual events or radiation (gamma ray) emissions per picture element of the scene, and the fluctuations in this number which in turn dictates the contrast attainable. In this discussion, a picture element refers to that particle or pair of points the camera system is capable of resolving. In systems designed to record alpha and X-ray emission, the limiting factor is found in the resolution obtained with available collimators. It is noted that the degree of contrast available determines the degree of resolution between adjacent elements and the extent to which the radiation scene may be examined and studied. The fluctuation in the number of events is equal to the standard deviation $\sqrt{N}$ for a random occurrence of photons, where N is the average number of events recorded per integration period. If the contrast C between neighboring picture elements $N_1$ and $N_2$ is defined as $$C=\frac{N_1-N_2}{N}$$

then the mean deviation $\sqrt{N}$ must be larger than $$(N_1-N_2)$$

by a factor of certainty $k$ to clearly recognize this difference as real and not merely a random fluctuation. In other words, the emission of gamma rays or X-rays from a source such as an isotope injected within the human body is not a regular but a random occurrence. The degree of the fluctuation of the gamma rays may be greater for a limited period of time than the number of emissions from neighboring elements due to their difference in intensity. Thus, in order to realize a contrast between neighboring picture elements greater than the natural fluctuation in the number of gamma rays emitted, the contrast $$C=\frac{N_1-N_2}{N}=\frac{k\sqrt{N}}{N}=k\left(\frac{1}{\sqrt{N}}\right) \quad (1)$$

In terms of the total number of gamma ray emissions per picture element P and the linear resolution R (or number of resolved units, line-pairs) along each edge of the image viewed, $$N=P/R^2 \quad (2)$$

Now substituting Equation 2 into Equation 1, $$C=k\left(\frac{R}{P^{1/2}}\right) \quad (3)$$

Figure 7:
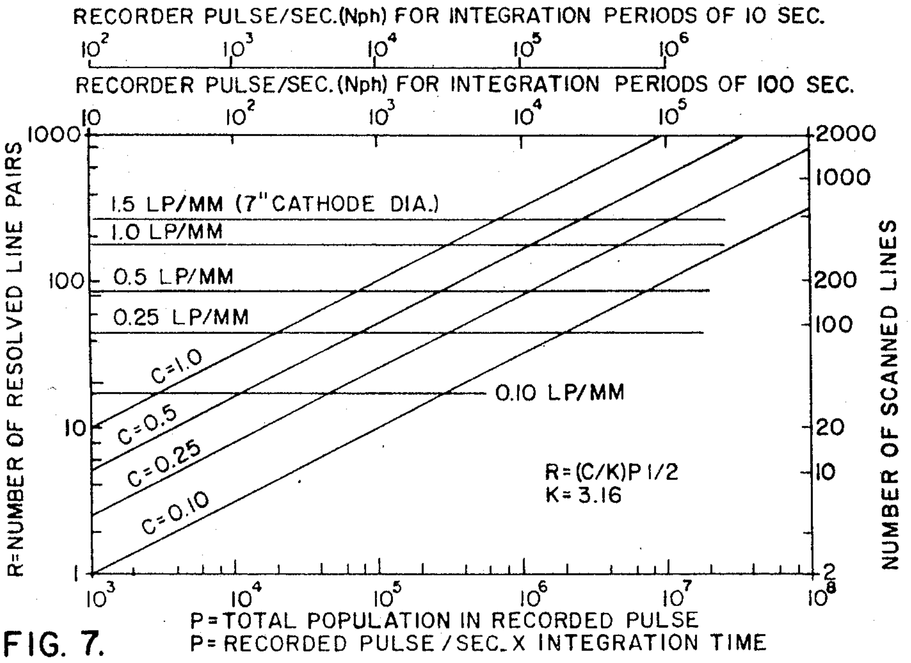
FIG. 7 shows a series of graphs representing the maximum theoretical resolution achievable from a camera device as a function of contrast and number of recorded quantum scintillations in the picture.

Experimental studies have shown that a bar pattern can be recognized by experienced observers when $k=3.16$. It is therefore possible to estimate how many scintillations or gamma ray emissions per picture element P are required to see a desired spatial resolution R with a specific contrast C. Equation 3 has been solved for R as a function of C and P and has been plotted in FIG. 7 in order to illustrate the problem of attaining high spatial resolutions in gamma ray isotope imaging systems. With regard to FIG. 7, the plot was made for an image intensifier having a 7 inch diameter image field. For one particular set of conditions, a resolution in the order of .5 line-pairs per millimeter for a high contrast of unity required that the target element 68 absorb $10^5$ recorded scintillations. In general, it may be concluded from FIG. 7 that a camera system capable of high resolution at low contrasts must have a target element capable of storing very large numbers of charges per picture element before saturating. With regard to the instant camera system, it has been shown that as many as $10^6$ electronic charges per 100 kv. gamma ray may be recorded on a target element per incident gamma ray. For a contrast of unity (i.e., $C=1$), 10 gamma ray quantum are required per picture element, while for a contrast of 0.3, this would increase to 100 quanta, thus requiring $10^7$–$10^8$ photoelectrons to be stored per picture element in any integration period. The target element illustrated in FIG. 2 has the required high storage capacity of about $10^7$–$10^8$ electrons per picture element, while the image-orthicon type of camera tube of the prior art can only store a maximum of approximately $10^3$ electronic charges per picture element. Finally it has been calculated that in order to perform imaging of a scene with a precision of approximately 1% it is necessary to be able to dispose a minimum of $10^4$ charges per picture element upon the target element 68.

Thus, there has been shown an X-ray or gamma ray camera system which has a performance substantially in excess of those known by the prior art. Presently used gamma-ray isotope systems such as those of Anger, and Bender and Blau have inherent geometric resolution limits of about 9 to 10 millimeters (or approximately .1 line-pair mm.). Further, other television camera imaging systems of the prior art, though having a spatial resolution similar to that of the present camera system are limited in that their target elements do not have the property of storage for long periods of time and have significantly smaller dynamic ranges, being able to store less than $10^3$ electrons per picture element. As a result of the intensification of the gamma ray image and the dynamic range and gain of the storage target element of this camera system, not only has there been achieved a high resolution and sensitivity to lower contrasts, but also this system has been able to achieve pulse height discrimination, subtraction of successive images upon the target element, and the production of equidensity traces which modes of operation could not be performed with the television camera systems or scintillation cameras of the prior art.

While there have been shown and described what are considered to be the preferred embodiments of the invention, modifications thereto will readily occur to those skilled in the art. It is not desired, therefore, that the invention be limited to the specific arrangement shown and described and it is intended to cover in the appended claims all such modifications which fall within the true spirit and scope of the invention.

I claim as my invention:

1. A system for sensing radiation derived from a scene composed of a plurality of spatially disposed elements in the presence of radiation from a spurious source, said system comprising means for collecting and converting a radiation image from said scene into a corresponding electron image, means for receiving said electron image and establishing a pattern of charges whose distribution is determined in accordance with said radiation image, said means for receiving said electron image having the capability of storing in excess of $10^4$ electrons for each of said elements and of rapidly discharging said pattern of charges to allow a second pattern of charges to be disposed thereon, means for deriving an output signal in accordance with said pattern of charges and for discharging said pattern of charges at a rate sufficient to insure that charges corrseponding to substantially only one quantum of radiation from each of said elements are stored at one time upon said means for receiving said electron image, and means for discriminating against that portion of said output signal representing radiation derived from said spurious source.

2. A system for selectively sensing radiation derived from a scene composed of a plurality of spatially disposed elements in the presence of radiation from a spurious source, said system comprising means for collecting and converting said radiation into a corresponding electron image, means for receiving said electron image and establishing a pattern of charges corresponding to said electron image, said means for receiving including a conductive member and a dielectric storage material disposed upon said conductive material as a porous layer having a density less than 10% of the bulk density of said storage material, said porous layer of storage material having the property of rapidly discharging said pattern of charges when bombarded with an electron beam, means for scanning the surface of said layer of storage material with an electron beam at a rate sufficient to insure that charges corresponding to substantially only the radiation quantum from each of said elements will be stored at one time upon said means for receiving and storing to thereby derive an output signal in accordance with said pattern of charges and to erase said pattern of charges, and means for discriminating against that portion of said output signal representing radiation from said spurious source and extraneous signals developed within said system.

3. A system for sensing radiation derived from a scene composed of a plurality of spatially disposed elements in the presence of radiation from a spurious source, said system comprising means for collecting and converting said radiation into a corresponding electron image, means for receiving said electron image and establishing a pattern of charges whose spatial distribution is determined in accordance with said electron image, said means for receiving including a conductive member and a dielectric storage material disposed thereon as a porous layer having a density less than 10% of the bulk density of said storage material, said layer of storage material exhibiting the property or rapidly erasing said pattern of charges under the bombardment of an electron beam, means for scanning a surface of said layer of storage material with an electron beam at a rate sufficient to insure that charges corresponding to substantially only one quantum of radiation from each of said elements are stored upon said means for receiving to thereby derive a signal corresponding to said pattern of charges and to erase said pattern of charges, means for receiving said output signal and for discriminating against that portion of said output signal representing radiation from said spurious source, and means operatively connected to said last mentioned means for quantitatively measuring the number of impulses of said output signal.

4. A system for sensing radiation derived from a scene composed of a plurality of spatially disposed elements in the presence of radiation from a spurious source, said system comprising a radiation intensifier tube including an input element for converting said radiation into a corresponding electron image, an output element for converting said electron image into a corresponding light image, and an electrode assembly disposed between said input and output elements for accelerating said electron image onto said output element; means for collecting and focusing said radiation onto said input element of said radiation intensifier tube; an image camera tube comprising a photocathode element for converting the light image emitted by said output element into a corresponding electron image, a target element for receiving and establishing said electron image emitted by said photocathode element as a pattern of charges, said target element including a conductive member and a dielectric storage material disposed upon said conductive member as a porous layer having a density of less than 10% of the storage material in bulk form, said layer of storage material exhibiting the properties of storing in excess of $10^4$ electrons for each of said elements and of rapidly erasing said pattern of charges under the influence of a low energy electron beam, and means for scanning a surface of said layer of storage material with an electron beam at a rate sufficient to insure that charges corresponding to substantially only one radiation quantum from each of said elements will be stored at one time upon said target element to thereby derive an output signal corresponding to said pattern of charges and to erase said pattern of charges, and means for receiving said output signal and for discriminating against that portion of said output signal representing radiation from said spurious source.

5. A system for sensing radiation derived from a scene composed of a plurality of spatially disposed elements, said system comprising means for collecting and converting said radiation into a corresponding electron image, means for intensifying said electron image, means for receiving and establishing said electron image as a pattern of charges corresponding to said electron image, said means for receiving and establishing including a conductive member and a dielectric storage material disposed on said conductive member as a porous layer having a density of less than 10% of the bulk density of said storage material, said layer of storage material exhibiting the property of storing in excess of $10^4$ electrons for each of said elements and of erasing said pattern of charges under the influence of an electron beam, means for directing an electron beam upon said layer at a rate sufficient to insure that charges corresponding to substantially only one radiation impulse for each of said elements are stored upon said layer to thereby derive an output signal in accordance with said pattern of charges and to erase said pattern of charges, means for selectively deflecting said electron beam over a portion of said layer of storage material to thereby enable said system to view a selected portion of said scene, and means for receiving said output signal and for discriminating against that portion of said output signal representing spurious signals.

6. A method of sensing radiation derived from a scene composed of a plurality of spatially disposed elements in the presence of radiation from a spurious source, said method comprising the steps of collecting and converting said radiation into a corresponding electron image, storing said electron image as a pattern of charges corresponding to said electron image, deriving a signal corresponding to said pattern of charges and substantially erasing said pattern of charges at a rate sufficient to allow charges corresponding to substantially only one radiation quantum to be stored per element of said scene, and discriminating against those portions of said signal representing radiation from said spurious source.

7. A method of sensing radiation derived from a scene composed of a plurality of spatially disposed elements in the presence of radiation from a spurious source, said method comprising the steps of collecting and converting said radiation into a corresponding electron image, storing said electron image as a pattern of charges corresponding to said electron image, deriving an output signal corresponding to said pattern of charges and erasing said pattern of charges at a rate sufficient to allow charges corresponding to substantially only one radiation quantum to be stored per element of said scene, discriminating against that portion of said output signal representing radiation from said spurious source, and quantitatively measuring the pulses of said output signal to derive an indication of the intensity of the radiation from said source.

8. A method of sensing and intensifying radiation derived from a scene composed of a plurality of spatially disposed elements in the presence of radiation from a spurious source, said method comprising steps of collecting and converting said radiation into a corresponding electron image, intensifying said electron image, storing said electron image as a pattern of charges corresponding to said electron image upon a target element comprising a conductive member and a storage material deposited upon said conductive member as a porous layer, scanning a beam of electrons across the surface of said layer of storage material at a rate sufficient to allow charges corresponding to substantially only one radiation quantum to be stored per element of said scene to thereby erase said pattern of charges and to derive an output signal in accordance with said pattern of charges, and discriminating against those portions of said output signal representing radiation from said spurious source.

9. A method of sensing radiation derived from a scene composed of a plurality of spatially disposed elements in the presence of radiation from a spurious source, said method comprising the steps of collecting and converting radiation into a corresponding electron image, directing said electron image onto a target element comprising a conductive member and a storage material disposed upon said conductive member as a porous layer, storing said electron image upon said layer of storage material as a pattern of charges, scanning an electron beam across a particular portion of an exposed surface of said layer of storage material at a rate sufficient to allow charges corresponding to substantially only one radiation quantum to be stored per element of said scene to thereby erase said pattern of charges and to obtain an output signal corresponding to a particular portion of said scene under investigation, and selectively discriminating against that portion of said output signal representing radiation from said spurious source.

10. A system for sensing radiation derived from a scene composed of spatially disposed elements, the quanta of radiation derived from said elements varying in the level of their intensity, said system comprising means for collecting and converting a radiation image into an electron image corresponding to said radiation image, means for receiving said electron image and establishing a pattern of charges distributed in accordance with said electron image, said means for receiving exhibiting the property of storing at least $10^4$ electrons for each of said elements, means for deriving an output signal corresponding to a portion of said pattern of charges above a first potential level and for erasing that portion of said pattern of charges above said first level, means for deriving an output signal from a second portion of said charge pattern above a second potential level and for erasing the remaining portion of said pattern of charges above said second level, said second potential level being less than said first level, and means for successively recording and storing said first and second signals to thereby derive traces for the radiations from said scene of substantially equal intensity.

11. A system for sensing and recording radiation of varying intensity comprising means for collecting and converting said radiations into an electron image corresponding to said radiations, means for receiving said electron image and establishing a pattern of charges distributed in accordance with said electron image, said means for receiving including a layer of storage material upon which said pattern of charges is disposed which exhibits the property of generating secondary electrons within said layer in response to a bombardment of primary electrons and a conductive member disposed on said layer, means for directing a beam of electrons onto said layer of storage material, means for successively applying potentials which are incrementally decreasing to said conductive member to thereby derive output signals representing portions of said pattern of charges corresponding to said potentials, and means for recording and storing each of said signals to provide a composite representation of said radiation image at discrete levels of intensity.

12. A system for sensing and recording radiation of varying levels of intensity comprising an image intensifier tube including an input element for converting a radiation image into a corresponding electron image, an output element for converting said electron image into a corresponding light image, and an electrode assembly disposed between said input and output electrodes for accelerating said electron image onto said output element; means for collecting and focusing said radiation image onto said input element of said image intensifier tube; an image camera tube comprising a photo-cathode element for receiving and converting said light image emitted by the output element of said image intensifier tube into a corresponding electron image, a target element comprising a conductive member and a storage material disposed on said conductive member as a porous layer having a density less than 10% of said storage material in bulk form, said storage layer exhibiting the property of generating secondary electrons within said layer in response to a bombardment of said electron image from said photocathode element to thereby form a pattern of charges upon said layer in accordance with said electron image emitted by said photocathode element, means for scanning the surface of said layer of storage material with a beam of electrons; means for successively applying potentials whose values are incrementally decreasing to said conductor member to thereby derive a series of signals representing portions of said pattern of charges at levels corresponding to said potentials; means for displaying in succession a trace corresponding to each of said series of signals; and a photographic camera for successively recording each of said traces to provide a composite picture representing said radiations at discrete, equal levels of intensity.

13. An electron image system for providing a series of signals at given levels comprising means for emitting an electron image, means disposed to receive said electron image and establishing said electron image as a pattern of charges distributed in accordance with said electron image, said last mentioned means including a layer of storage material exhibiting the property of generating secondary electrons within said layer in response to the bombardment of electrons and a conductive member disposed upon said layer, means for scanning said layer of storage material with a beam of electrons, and means for successively applying a series of potentials whose values are incrementally decreasing to said conductive member to thereby derive a corresponding series of signals representing discrete, equal levels of said pattern of charges as determined by said series of potentials.

14. A method of sensing radiation of varying intensities and providing a composite output signal representative of traces of said radiation at discrete levels, said method comprising the steps of collecting and converting a radiation image into a corresponding electron image, intensifying said electron image, storing said electron image as a pattern of charges whose spatial distribution corresponds to said electron image, deriving a first signal from that portion of said pattern of charges whose potential is above a first level and erasing that portion of said pattern of charges above said first level, storing said first signal, deriving a second signal from that portion of said pattern of charges whose potential is above a second level and erasing that portion of said pattern of charges above said second level, and combining said first signal with said second signal to thereby provide a composite representation of said radiations viewed at said discrete levels.

15. A system for sensing and recording radiation of varying levels of intensity comprising means for receiving and converting a radiation image into a corresponding electron image, means disposed to receive said electron image and establishing said electron image as a pattern of charges distributed in accordance with said electron image, said means for receiving having the property of storing said pattern of charges without substantial loss of amplitude and of rapidly erasing portions of said pattern of charges in response to a beam of electrons, means for scanning said means for storing with said beam of electrons, and means for accelerating said beam of electrons with a series of potentials whose values are incrementally changing to thereby derive a corresponding series of output signals representing said radiation at discrete levels of intensity.

16. A method of sensing radiation of varying intensity and providing a composite output signal representative of traces of said radiation at discrete levels, said method comprising steps of collecting and converting a radiation image into a corresponding electron image, intensifying and directing said electron image onto a target element including a conductive member and a storage material disposed as a porous layer upon said conductor member, said layer of storage material having the property of generating secondary electrons within said layer in response to an electron bombardment to thereby provide a pattern of charges whose spatial distribution is determined in accordance with said electron image, deriving a first signal from that portion of said pattern of charges whose potentials are above a first level and erasing that portion of said pattern of charges above said first potential from said target element, storing said first signal, deriving a second signal from that portion of said pattern of charges whose potentials are above a second level and erasing that portion of said pattern of charges above said second level, said second level being less than said first level, and superimposing said second signal upon said first storage signal to provide a composite output signal representative of traces of said radiation at discrete levels.

17. A method of sensing radiation of varying intensities and providing a composite representation in the form of equidensity traces of said radiation, said method comprising the steps of collecting and converting a radiation image into a corresponding electron image, intensifying and directing said electron image onto a target element including a conductive member and a storage material being deposited upon said conductive member as a porous layer, said layer of storage material having the property of generating secondary electrons within said layer in response to electron bombardment to thereby provide on said layer a pattern of charges whose spatial distribution corresponds to said electron image, directing a first beam of electrons onto the exposed surface of said layer with a first accelerating potential to thereby derive a first output signal which corresponds to that portion of said pattern of charges above said first potential and to erase that portion of said pattern of charges above said first potential, storing said first output signal, directing a second electron beam onto the exposed surface of said layer with a second accelerating potential less than said first potential to thereby derive a second output signal representative of that portion of said pattern of charges above said second potential and to erase that portion of said pattern of charges above said second potential, and superimposing said second signal upon said stored first signal to thereby derive a composite representation of equidensity traces of the radiation at said first and second potentials.

18. A method of recording an image comprised of a plurality of elements of varying intensities and providing an output signal representative of the equidensity traces of said image at discrete levels, said method comprising the steps of providing an electron image corresponding to the spatial distribution of said elements and directing said electron image onto a storage element including a conductive member and a storage material disposed upon said conductive member as a layer, storing said electron image upon said storage element as a pattern of charges whose spatial distribution corresponds to that of said electron image, scanning the surface of said layer of storage material with a beam of electrons accelerated to a potential set at a first level to thereby obtain a first output signal corresponding to that portion of said pattern of charges whose potential is above said first level and to erase that portion of said pattern of charges above said first level, storing said first signal, scanning a beam of electrons upon the exposed surface of said layer of storage material with an accelerating potential set at a second level below said first level to thereby derive a second output signal representing that portion of said pattern of charges above said second level and to erase that portion of said pattern of charges above said second level, and superimposing said second signal upon said first signal to derive a composite representation of the equidensity traces of said image at discrete levels as determined by said first and second levels.

19. A method of sensing radiation of varying intensities and providing a series of signals representing equal levels of said radiation, said method comprising the steps of converting a radiation image into a corresponding electron image, directing said electron image onto a target element exhibiting the property of storing without substantial loss of said electron image as a corresponding pattern of charges and of rapidly discharging desired portions of said pattern of charges in response to electron bombardment, deriving a first signal from that portion of said pattern above a first potential level and erasing said portion above said first potential level, and deriving a second signal representing that portion of said pattern of charges above a second potential level and erasing the remaining portion of said pattern of charges above said second potential level.

20. A method of sensing a radiation image having at least first and second portions thereof of varying intensities and providing a composite representation in the form of traces of said portions of said radiation image, said method comprising the steps of converting said radiation image into a corresponding electron image, directing said electron image onto a target element having the properties of storing said electron image as a corresponding pattern of charges and of rapidly discharging desired portions of said patterns of charges in response to electron bombardment, scanning the surface of said target element with a beam of electrons accelerated to a potential set at a first level to thereby obtain a first output signal corresponding to that portion of said pattern of charges above said first level and erasing that portion of said pattern of charges above said first level, storing said first output signal, scanning the surface of said target element with a beam of electrons accelerated to a potential set at a second level to thereby erase that portion of said pattern of charges between said first and second levels, scanning the surface of said target element with a beam of electrons accelerated to a potential set at a third level to thereby derive a second output signal corresponding to that portion of said pattern of charges between said second and third levels, and superimposing said second output signal upon said stored, first output signal to provide a composite representation corresponding to said first and second portions of said radiation image as determined by said first and third levels and having an intermediate blank portion between said first and second portions.

References Cited

UNITED STATES PATENTS

| | | | |
|---|---|---|---|
| 2,802,951 | 8/1957 | Seevers | 250—83.3 X |
| 3,107,276 | 10/1963 | Cohen | 250—83.3 X |

ARCHIE BORCHELT, Primary Examiner

U.S. Cl. X.R.

250—77, 213